April 9, 1946.   J. W. NAPIER   2,398,151
SEPARATE SECTION ABUTMENT RING MOLD COMPONENT
FOR TIRE RECAPPING APPARATUS
Filed Sept. 6, 1944
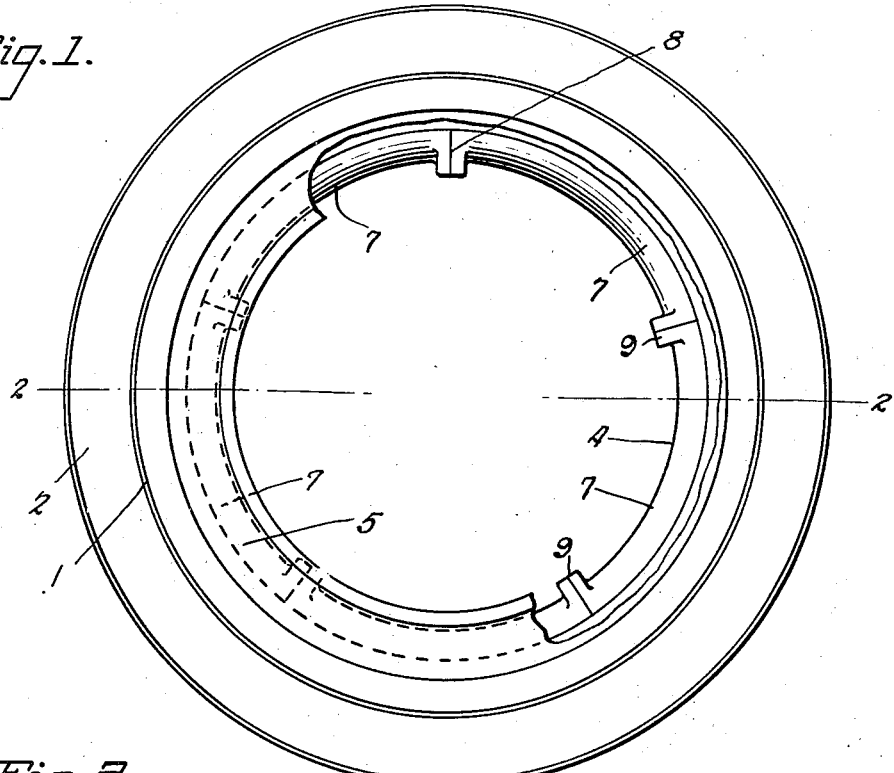
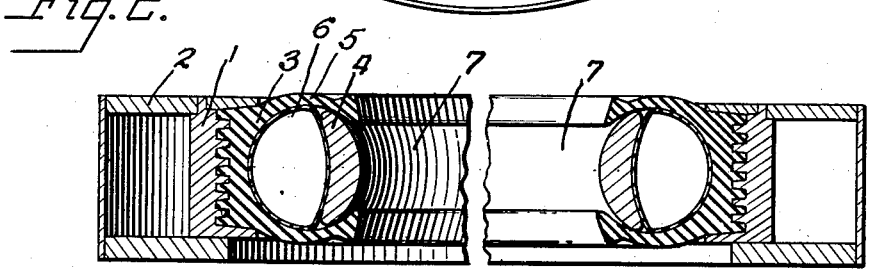
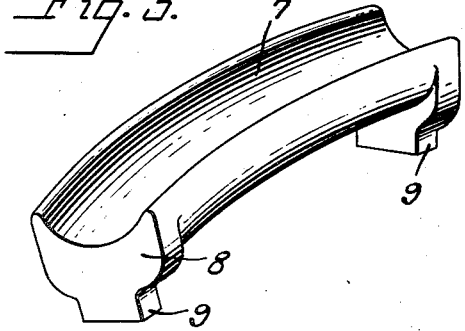
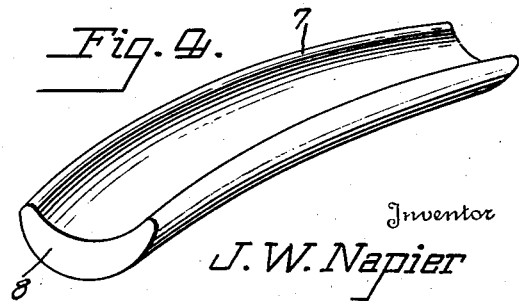
Inventor
J. W. Napier Patented Apr. 9, 1946

2,398,151

UNITED STATES PATENT OFFICE 2,398,151

SEPARATE SECTION ABUTMENT RING MOLD COMPONENT FOR TIRE RECAPPING APPARATUS

James W. Napier, Macon, Ga., assignor to Clement O. Dennis, Macon, Ga.

Application September 6, 1944, Serial No. 552,909

1 Claim. (Cl. 18—18)

This invention relates to apparatus for recapping tire casings.

Such apparatus essentially comprises a pair of mold components, including an outer annular matrix formed with the tread pattern and an inner abutment ring, between which mold components the casing carrying the tread strip to be vulcanized is positioned, with an inflatable tube within the casing adapted to be expanded by inflation against the annular abutment on the one hand and the casing on the other, to press the casing and attached tread strip against the matrix.

The present invention relates to the abutment ring.

Conventional abutment rings are made in the form of a series of hinged arcuate sections separated at one point so that they can be collapsed for insertion into the open side of the casing. Since the sections are joined, they make a heavy unit, necessitating the provision of a crane on the recapping apparatus for inserting or removing the abutment ring. The fact that the sections are joined as a unit makes it necessary to spread the bead margins of the casing all around at one time to permit the insertion of the abutment ring. It may readily be gathered from the above that the locating of the abutment ring in operative position is an awkward and more or less difficult operation. Other objections attend the use of a jointed outer abutment ring, but the foregoing will suffice as background against which to contrast the simplicity of construction and mode of operation of the device of the present invention.

The object of the invention is to provide an abutment ring composed of separate unconnected sections having planiform radial end faces, which sections may be placed within the casing, one at a time, in loose circumferential arrangement while the tube is deflated or only slightly inflated, and which under the uniformly distributed pressure of the inflation, move independently radially toward the axis of the casing until their radial end faces abut, thereby keying them into a rigid closed annulus.

Other objects of the invention will appear as the following description proceeds.

In the drawing:

Figure 1 is a plan view of a tire recapping mold illustrating the abutment ring of the present invention;

Figure 2 is a diagrammatical cross-section taken along the line 2—2 of Figure 1;

Figure 3 is a perspective view of one of the sections of the abutment ring;

Figure 4 is a perspective view of a modified form of section.

Referring now in detail to the drawing, the recapping mold comprises a hollow annular matrix 1, supported by the structure 2 and suitably heated, receiving the tread area of the tire casing 3, and a complementary mold member in the form of an abutment ring 4 inserted in the casing between the side walls 5. An inflatable tube 6 is within the casing between the tread portion of the latter and the abutment ring. Pressure of the inflated tube reacts, on the one hand, against the abutment ring, and on the other hand, against the casing pressing the tread portion of the latter against the inner face of the matrix.

The abutment ring is made up of a plurality of independent unconnected arcuate sections 7. In the drawing, five such sections are shown, but their number is immaterial. Each is of relatively light weight and can be placed in the casing by hand with little effort. The sections 7 are each provided with planiform end faces 8 in radial planes with respect to the axis of the abutment ring when closed. It is preferred to place them while the tube 6 is either deflated or only slightly inflated. They are put into the casing one at a time, in loose circumferential arrangement. Then the tube 6 is inflated, developing uniform pressure all around, which moves the sections 7 independently radially toward the axis of the abutment ring until the planiform end faces 8 come into abutment, in which positions the sections 7 are mutually keyed into a self centered rigid annulus.

The casing has to be spread only at one point at a time, and this can be easily done by hand, without requiring any spreading apparatus as with the unitary abutment ring construction.

The section shown in Figure 3 differs from that shown in Figure 4, in having the planiform end face 9 extended depthwise in a radial direction by means of lugs 9. In Figure 4 the section is of uniform cross-section throughout, so that the end faces are less extensive in radial depth. Occasionally, a casing has a rough spot on the inside which may frictionally detain one of the sections, preventing it moving uniformly with the other sections under the inflation pressure. Under such conditions, the retarded section may be overrun by the adjacent sections if the end faces of the sections are of shallow radial depth as in Figure 4. The greater the radial depth of the end faces, the less likely is this apt to occur.

It will be understood from the above description that I have provided an abutment ring which is simple in construction, which may be readily manually positioned, a part at a time within the casing, without the necessity of spreading the casing simultaneously all around, in which the sections move independently under the inflation pressure of the tube, self centering the abutment ring and in their ultimate positions, keying the structure into a rigid closed annulus.

I claim:

In apparatus for recapping tires, of that type in which the mold members comprise an outer annular matrix and a concentric inner abutment ring spaced therefrom, the tire containing an inflatable tube being positioned between said mold members whereby the inflation pressure of the tube reacting against the abutment ring presses the tread face of the casing against the outer mold member, said abutment ring comprising a plurality of independent unconnected rigid arcuate sections, each having a greater radial depth dimension at the ends than between the ends, each terminating in planiform end faces extending in radial planes with respect to the axis of the closed abutment ring, movable under uniformly distributed circumferential pressure into mutually keyed annular relationship.

JAMES W. NAPIER.